June 20, 1967 S. D. DE LAJARTE ET AL 3,326,653
METHOD AND APPARATUS FOR CONVEYING A GLASS SHEET
ON A MOLTEN METAL BATH
Filed April 15, 1964 3 Sheets-Sheet 3
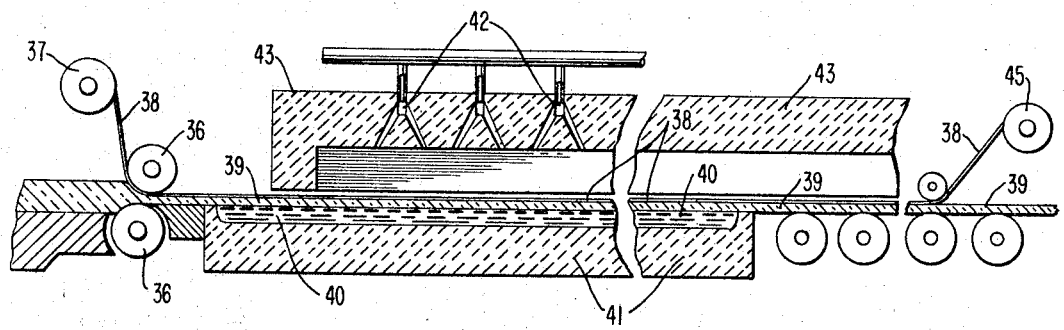
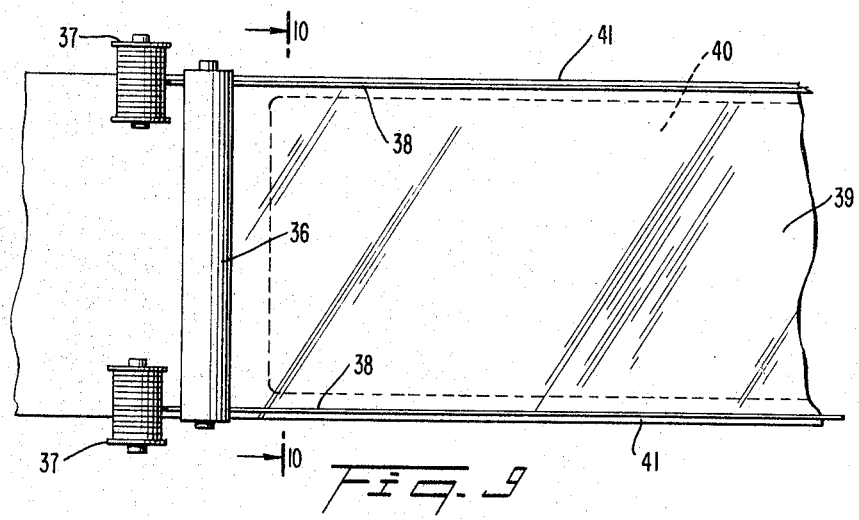
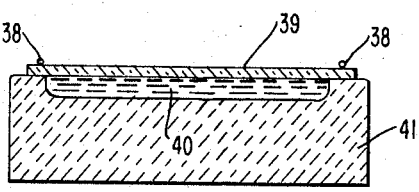
INVENTORS
STEPHANE DUFAURE de LAJARTE
BY MAURICE BOURGEAUX
*Bauer and Seymour*
ATTORNEYS United States Patent Office 3,326,653
Patented June 20, 1967

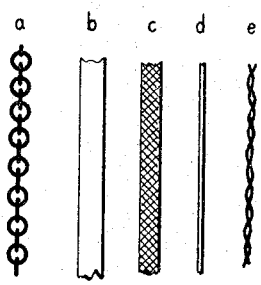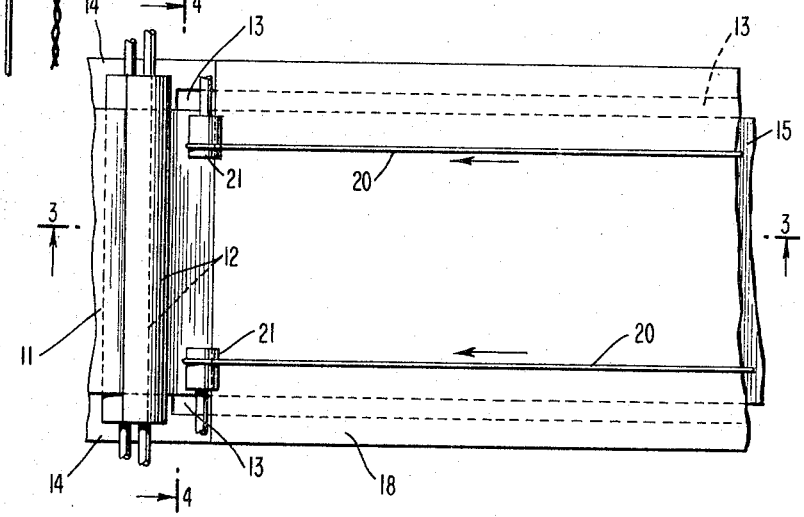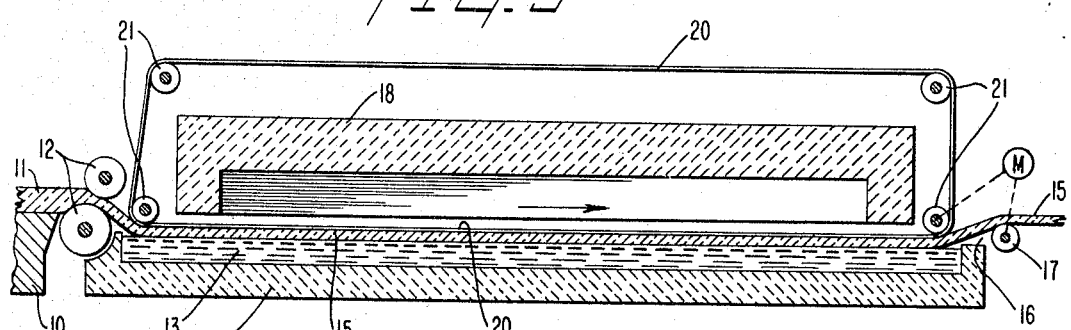

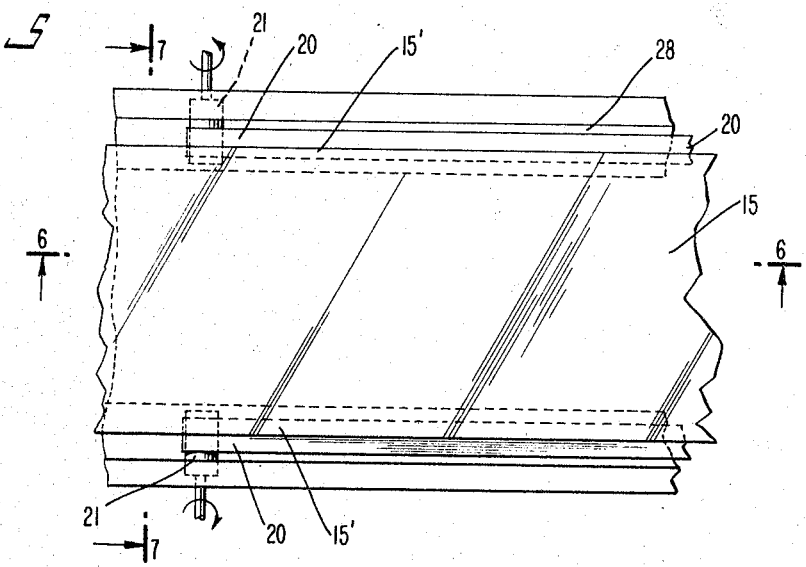
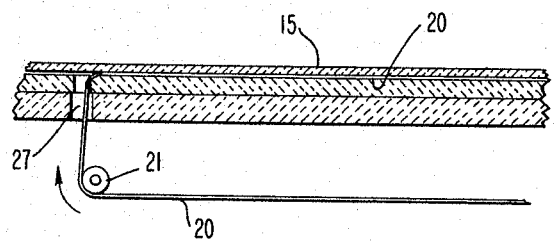
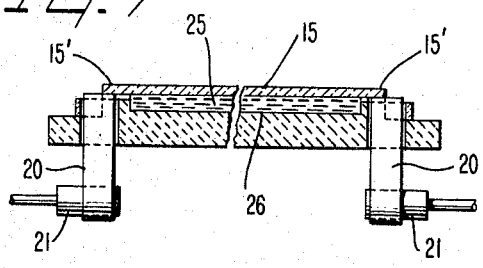

3,326,653
METHOD AND APPARATUS FOR CONVEYING A GLASS SHEET ON A MOLTEN METAL BATH
Stephane Dufaure de Lajarte and Maurice Bourgeaux, Paris, France, assignors to Compagnie de Saint-Gobain, Neuilly-sur-Seine, France
Filed Apr. 15, 1964, Ser. No. 359,921
Claims priority, application France, Apr. 16, 1963, 931,626
14 Claims. (Cl. 65—99)

This invention relates to the manufacture of flat glass. The invention is particularly concerned with the maintenance of the dimensions of glass sheets after casting, particularly to maintaining the lateral dimensions of continuous sheets of glass which are traveling along the surface of a support of molten metal, such as tin, and the invention will be described in connection with this particular problem although it is susceptible of other uses.

It is known that in the process of making flat glass continuously, in which the glass in a state which is still fluid is brought into contact with a liquid support, the object of which is to produce a flat and fire-polished surface, there are difficulties in maintaining the transverse dimensions of the glass sheet, in maintaining its direction, and in maintaining uniformity of speed. These difficulties increase with the temperature of the glass and with the reduction of its viscosity.

It is an object of the invention to guide glass sheets, specially while in contact with fluid supporting media, to promote uniformity of speed throughout the width of the sheet, and to restrain the sheet against deviations in width or direction.

The objects of the invention are accomplished generally speaking by a process of guiding flat glass in a molten state which comprises bringing the molten flat glass into contact with flexible guiding means to which the edges of the sheet of molten glass adhere, and moving the guiding means along the course over which the glass is to travel. As to apparatus the objects of the invention are accomplished by apparatus for the manufacture of flat glass comprising liquid supporting means, means to form a sheet of flat glass and introduce it to the supporting means, flexible guiding means adherent to molten glass extending along the sheet at glass level, and means to move sheet and guiding means at the same speed.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a diagrammatic representation of different types of conveyor means;

FIG. 2 is a top plan view of the head end of the apparatus incorporating the invention;

FIG. 3 is a vertical cross section along the line 3—3 of FIG. 2;

FIG. 4 is a vertical cross section along the line 4—4 of FIG. 2;

FIGS. 5, 6 and 7 are plan, longitudinal sectional, and transverse sectional views of a modified form of the invention, FIGS. 6 and 7 being taken respectively on lines 6—6 and 7—7 of FIG. 5.

FIGS. 8, 9 and 10 are plan, longitudinal sectional and transverse sectional views of another embodiment of the invention.

Referring now to FIGS. 2, 3 and 4 a furnace 10 discharges molten glass 11 at working temperature to sheet-forming rollers 12 which form the sheet and deliver it to a molten-metal bath 13 contained in a tank 14 forming part of a heat controlling oven which extends along the furnace room. The sheet of glass 15 travels along the surface of the molten metal, on which it receives a fire polish, and on which it is gradually cooled as it approaches the discharge opening 16, at which point it has been sufficiently cooled to be handled by ordinary handling means such as rollers 17, by which it is transported toward the cutting station. The dome 18 of the oven is furnished means, not shown, for controlling the internal temperature so as to produce the leveling, fire polishing, and cooling of the glass to handling temperature, that is to say, to temperature at which it can be handled by rollers without surface damage. It is in this process and apparatus that the problems arise which have been referred to hereinabove. In order to overcome these problems, guiding means 20 are provided which pass over rollers 21, of which the lower rollers introduce the guiding means to and remove it from the surface of the glass adjacent the edges thereof. The rollers and glass are to be driven at the same speed, which can be accomplished by driving the roller 21 and the supporting roller 17 at the discharge end of the oven at equal peripheral speeds.

The invention thus involves the principle of putting the lateral borders of the glass sheet in contact with guide means as soon as the sheet of glass has attained its proper dimensions, that is to say shortly after its formation. These guiding elements should be continuous and flexible but made of a solid material which is adherent to the molten glass, and they are to be driven at the same speed as the glass and to accompany it in its movement. These guiding elements have the effect of insuring a uniform speed to the glass edges along the whole length of the ribbon, they guide the movement of the ribbon and they restrain it from lateral movement on the liquid support. The glass sheet in its fluid state is thus led to travel a truer course at more uniform speed across its width, and is discharged in a more perfect state, particularly as to condition of surface.

According to another characteristic of the invention these guiding elements may be used to supplement the normal driving means which move the sheet.

The guiding elements may be composed of wires or cables, grills, ribbons, chains, belts of metal or metal alloy, for instance those which are made of ordinary steel or of refractory alloys. It is also possible to use ribbons of asbestos or of other refractory non metallic materials.

Because the glass is fluid when it makes contact with the guiding elements the adherance of the two one to the other is easily obtained and will take place as soon as contact is made. If desired, like pressure can be applied, for instance by the guide rollers which deliver the elements to the sheet. It is not necessary that the continuous elements penetrate into the glass because the adhesion by the glass and the elements is sufficient to provide adequate driving power, it being understood that the coefficient of friction between the glass and the liquid support is low. It is even preferable in most cases, that the guide element should adhere only superficially or lightly to the glass sheet, which is usually adequate for all purposes and makes it easier to detach the glass from the conveyor.

In FIGS. 5, 6 and 7 is shown a modification of the invention in which the guiding elements 20 are transported beneath the floor of the oven rather than over its dome as in FIGS. 2–4. In this modification the glass sheet is supported on a thin layer 25 of molten tin which is retained in a shallow trough, presenting an inverted meniscus which projects above the edges of the trough as viewed in FIG. 7. The edges 15' of the glass sheet extend beyond the supporting metal and rest upon the guiding elements 20 which move at the same speed as the glass sheet. The elements 20 project upward through slots 27 outside the trough 26 and support the edges, preventing them from sagging into contact with the fixed parts of the apparatus, a fault which previously produced a drag and might cause some distortion in the sheet surface by the drag of the edges on the fixed parts.

The guiding elements slide over bearing surfaces provided on the shoulders 28 of the trough 26. They are kept tight by such means as are ordinarily employed for maintaining the tautness of the conveyor belts.

In FIGS. 2–4 the guide elements adhere to the upper surfaces of the glass sheet while in FIGS. 5–7 they adhere to the lower surface. In either case they contribute to the uniformity of progress of the sheet and reduce aberrations. In FIGS. 5–7 the carrier is observed to extend beyond the edges of the sheet. Thus the carriers both sustain the edges of the sheet and guide and transport it because of their mutual adherence.

The apparatus of FIGS. 2–4 has been used successfully in cooperation with a bath of molten tin to handle a glass sheet having an initial viscosity between $10^{3.7}$ to $10^{4.2}$ poises, which correspond for ordinary window glass to a temperature between 1000° and 1100° C. The apparatus of FIGS. 5–7 not only guides the glass on the liquid support but moves it on its way. This has an additional advantage that it is not necessary to chill the borders of the glass to prevent them from sagging into contact with the shoulders, which sometimes happened.

The invention contemplates an improvement in the manufacture of flat glass in which the glass while still fluid is brought into contact with the liquid support and is maintained in its definitive dimensions by being brought into contact, preferably along its edges, with guiding elements, of flexible conveyor type, which are made of a material which is adherent to molten glass and which travels along with the glass until the glass has attained a lower temperature capable of being handled and of being separated regularly from the conveyors. In case the conveyors mark the edges of the glass, the markings can be reduced by trimming off the damaged areas, for instance by means of scribes placed slightly inward from the edges of the glass sheet.

In FIGS. 8, 9 and 10 another modification of the invention is shown wherein the guiding elements are laid over the molten glass by guiding them under the upper laminating roller 36 and thus causing them to contact the molten glass upstream of the place where it is formed into a sheet.

As shown in these figures the molten glass issues from a melting oven at a temperature of some 1100 to 1200° C. and is brought at this temperature between the laminating rollers 36. Double reels 37 are provided above the laminating rollers. From each reel 37 two metal wires 38 are guided into contact with the surface of the upper laminating roller upstream from the place of formation of the sheet of molten glass along both edges of this sheet in the area where these edges are formed. The tension of the guiding wires is obtained and controlled by means not shown and well known in the art. Usual iron wires having a diameter of 1 to 1.5 mm. can be used as guiding elements. Two wires are provided on each side of the sheet to insure the continuity of the process when a reel of wire has been emptied and has to be replaced and as a security should a wire be ruptured by accident.

At the temperature provided for the laminating operation the viscosity of the glass is low and the metal wires adhere immediately to the upper surface of the glass sheet.

Immediately after its lamination, the glass ribbon 39 is laid on a capillary liquid support 40. The edges of the glass sheet extend over the edges of the trough 41 containing the metal support to slide over these edges on both sides of the metal support. The supporting liquid can be molten tin.

The temperature of the glass ribbon is then brought to 1000 to 1050° C. for example with gas radiant burners 42 located in the arch 43. The glass is maintained at this temperature during about two minutes, all surface defects produced during the rolling operation being eliminated usually after this length of heating. The glass ribbon has then received an aspect of fire polish and is cooled to a temperature of 550 to 600° C. while it is supported by the capillary liquid support. At this temperature the glass sheet is transferred over supporting rollers and further cooled.

The width of the glass sheet has been maintained throughout the process by the metal wires adhering to the edges of the sheet. These wires are removed from the surface of the cooled sheet and wound on spools 45.

The following example illustrates the invention as applied to the manufacture of ordinary window glass:

A glass having the following composition:

| | |
|---|---:|
| $SiO_2$ | 72.4 |
| $Al_2O_3$ | 1.20 |
| $Na_2O$ | 14.16 |
| $K_2O$ | 0.01 |
| $CaO$ | 8.10 |
| $MgO$ | 3.00 |
| $Fe_2O_3$ | 0.13 |
| $SO_3$ | 0.30 | is obtained from a batch comprising the following elements:

| | Kg. |
|---|---:|
| Sand | 819.06 |
| Soda carbonate | 235.68 |
| Soda sulfate | 49.38 |
| Limestone | 43.77 |
| Dolomite | 204.89 |
| Hydrated alumina | 15.85 |
| Carbon | 3.22 |
| Iron oxide | 1.22 |

1373 kg. of this batch will produce 1120 kg. of glass having the hereabove composition.

This glass is heated to a temperature at which its viscosity is comprised between 1000 and 3000 poises and then introduced between the laminating rollers. The thickness of the sheet, if desired, can be easily controlled between 3 and 8 mm.

When the apparatus of FIGURES 8 to 10 is used, a sheet of excellent quality is obtained by rolling the glass to feed the glass sheet at a speed of 3 to 5 m./min.

As many apparently widely different embodiments of the present invention may be made without departing from the spirit and scope thereof, it is to be understood that the invention is not limited to the specific embodiments.

What is claimed is:

1. The method of producing flat glass by molten metal flotation, comprising, depositing molten glass in the form of an incipient ribbon, onto an elongated bath of molten metal, simultaneously contacting one horizontal surface of the incipient ribbon of molten glass at each respective side edge thereof, with a respective one of two bands of flexible heat-resistant material, so that each band adheres to the glass, and translating the glass and bands in contact therewith, as a unit over and along the bath.

2. The method of claim 1, and separating the bands from the glass at the delivery end thereof.

3. The method of claim 1, said bands contacting the upper surface of the ribbon.

4. The method of claim 1, said bands contacting the lower surface of the ribbon.

5. The method of claim 1, each said band being under tension and passing in continuous unbroken contact with the ribbon of glass, in parallel transversely-spaced paths, from the point of inception of the ribbon to the point of delivery from the bath.

6. The method of claim 1, said bath of molten metal being confined in a tank having horizontally coplanar parallel side edges, said molten metal having a surface forming an inverted meniscus slightly above the plane of said edges, for supporting the ribbon, each said band passing over and along a respective one of said side edges in straight parallel laterally-spaced passes, said ribbon having its side edges overlapping the side edges of the tank and in contact with and adherent to a respective one of said bands.

7. The method of claim 6, each said band being adherent to the upper surface of the ribbon of glass.

8. The method of claim 6, each said band being disposed between its respective side edge of the tank and the corresponding edge of the ribbon.

9. In an apparatus for forming flat glass by molten metal flotation, a tank having a feed end and a delivery end, and adapted to contain a bath of molten metal having a planar horizontal surface, means at said feed end to deposit an incipient ribbon of molten glass onto the bath in said tank, first and second bands of flexible heat-resistant material, means guiding each said band in a respective one of two straight parallel paths along the respective sides of said tank and in positions for continuous contact with a horizontal surface of the side edges of the ribbon of glass supported on molten metal in said tank, in travel between said feed end and said delivery end.

10. The apparatus of claim 9, said guiding means bringing each said band into contact with the glass at points closely adjacent the feed end of said tank, and separating each said band from the glass at the delivery end of the tank.

11. The apparatus of claim 10, said bands being endless, said guide means comprising rollers guiding said bands in return paths externally of the tank, to the feed end thereof.

12. The apparatus of claim 9, said tank having flat coplanar side edges, said guide means guiding each said band in a straight pass over and along a respective side edge of the tank.

13. The apparatus of claim 12, said straight passes being parallel and each in contact with a respective side edge surface of the tank.

14. The apparatus of claim 9, each said band being an iron wire of about 1 to 1.5 mm. diameter.

References Cited
UNITED STATES PATENTS

| | | | |
|---|---|---|---|
| 1,548,435 | 8/1935 | Bock | 65—176 |
| 2,298,348 | 5/1940 | Coxe | 65—182 |
| 2,689,982 | 9/1954 | Chynoweth | 65—99 |
| 2,986,843 | 6/1961 | Lovkomsky | 65—90 |
| 3,083,551 | 4/1963 | Pilkington | 65—65 |
| 3,186,813 | 6/1965 | Pfaender | 65—90 |
| 3,222,154 | 12/1965 | Pilkington | 65—91 |
| 3,264,081 | 8/1966 | Pilkington | 65—182 X |

DONALL H. SYLVESTER, *Primary Examiner.*

G. R. MYERS, *Assistant Examiner.*